United States Patent [19]

Andersson et al.

[11] Patent Number: 5,055,849
[45] Date of Patent: Oct. 8, 1991

[54] METHOD AND DEVICE FOR MEASURING VELOCITY OF TARGET BY UTILIZING DOPPLER SHIFT OF ELECTROMAGNETIC RADIATION

[75] Inventors: Henry Andersson, Espoo; Eero Salasmaa, Helsinki, both of Finland

[73] Assignee: Vaisala Oy, Finland

[21] Appl. No.: 594,326

[22] Filed: Oct. 9, 1990

[30] Foreign Application Priority Data

Oct. 26, 1989 [FI] Finland ................................ 895094

[51] Int. Cl.$^5$ .................... G01S 13/58; G01W 1/08
[52] U.S. Cl. ........................................ 342/104; 342/26; 342/461; 342/99; 340/870.1
[58] Field of Search ................... 342/50, 104, 26, 99, 342/56, 418, 461; 340/870.1; 73/189; 455/69, 70, 71, 260, 265

[56] References Cited

U.S. PATENT DOCUMENTS

| | | | |
|---|---|---|---|
| 2,939,132 | 5/1960 | Tollefsson | 342/104 |
| 3,781,715 | 12/1973 | Poppe, Jr. et al. | 342/50 X |
| 4,754,283 | 6/1988 | Fowler | 342/104 X |

Primary Examiner—Gilberto Barrón, Jr.
Attorney, Agent, or Firm—Jones, Askew & Lunsford

[57] ABSTRACT

A method for measuring the velocity (v) of a moving target (A). Radio signals are transmitted by means of radio transmitter-receiver arrangements of both the measuring station (B) and the target station (A) and received at the opposite stations (A,B), the frequencies of which signal include Doppler shifts (fd) to be observed both at the measuring station (B) and in the measuring target (A). On the basis of the Doppler shifts (fd), the escape and/or approach velocity (v) of the target to be measured is determined relative to the measuring station (B). Radio signals are transmitted from the measuring station (B) and the target station (A), the frequencies of which signals deviate from each other by a relatively small frequency difference (fk) or by a Doppler frequency shift (fd), the absolute value of which small frequency difference remains at least as high as the absolute value of the largest expectable Doppler frequency shift (fd$_{max}$). A difference frequency or difference frequencies (fb, fa) of the frequency including the Doppler shift (fd) and received at the measuring station (B) and the target station (A) and of the reference frequency of essentially the signal frequency range developed locally are formed in such a way that a low-frequency or possibly a zero-frequency signal at the target station is obtained as the difference frequency or frequencies (fb, fa). On the basis of the difference frequencies (fb, fa), the Doppler frequency shift (fd) is determined, by means of which the velocity (v) of the target (A) is obtained.

9 Claims, 4 Drawing Sheets

METHOD AND DEVICE FOR MEASURING VELOCITY OF TARGET BY UTILIZING DOPPLER SHIFT OF ELECTROMAGNETIC RADIATION

The invention relates to a method for measuring the velocity of a moving target by utilizing electromagnetic radiation, most preferably within the radio frequency range, in which method a radio transmitter-receiver arrangement is used both at the measuring station and in the target to be measured, by means of which radio signals are transmitted and correspondingly received at the opposite stations, the frequencies of which signals include Doppler shifts to be observed both at the measuring station and in the measuring target, and on the basis of said Doppler shifts, the escape and/or approach velocity of the target to be measured is determined relative to the measuring station.

The invention further relates to a device for realizing the inventive method, which device comprises a transmitter-receiver arrangement as well as an antenna at the measuring station, and a corresponding transmitter-receiver combination as well as an antenna in the moving target to be measured.

Several methods are known, by means of which the distance of the target and its rate of change is measured by using electromagnetic radiation. These known methods also utilize the time consumed for the advancement of the radiation between a target and a measuring station.

A distance measurement is also based on the time difference measurement by using known pulse radars. Disadvantages of the method include a high radiation power required at the measuring station and a radar reflector needed in the target. The disadvantages mainly result from the fact that the power received at the measuring station from the reflector is inversely proportional to the fourth power of the distance between the measuring station and the target. As a disadvantage can also be mentioned that the pulse radar has a broad bandwidth and that it thus requires a large range from the radio frequency spectrum.

A solution with a narrow bandwidth corresponding to the pulse radar is also known, i.e. a Doppler CW-radar, but the change in the distance cannot be unequivocally determined by means of this solution, since the sign of the rate of change between the measuring station and the target cannot generally be obtained by means of the Doppler CW-radar, i.e. it cannot be determined by means of the Doppler difference, whether the distance between the target and the measuring station is decreasing or increasing. Other disadvantages are similar to those of the pulse radar, since the operation complies with a radar equation.

A so-called secondary radar based on the time-difference measurement is also previously known, which uses a transponder placed in the target. The target then requires a receiver on the frequency of the transmitter of the measuring station and a transmitter on another frequency, which is located at such a long distance from the transmitter of the measuring station that the reception of weak signals coming from the measuring station is not disturbed. The transmission received by the transponder is detected in the secondary radar and it modulates the transponder transmitter, whose transmission is received at the measuring station. The transmission time of the radio waves can be determined by comparing the transmission sent from the measuring station and the received transmission of the target, when the signal to be transmitted from the measuring station is suitably modulated. Relatively low transmission powers are sufficient at the measuring station and in the target, since the secondary radar does not comply with a radar equation, but the suppression of the signals within the communication range is inversely proportional to the square of the distance. The need for frequency channels spaced relatively apart from each other is a drawback of the transponder system. Depending on the modulation method, the transmissions often have also a broad bandwidth.

In the references "Passive Tracking of Meteorological Radio Sondes for Upper Air Wind Measurements", H. K. E. Tiefenau, A. Sprenger KG GmbH & Co, BRD, and in the Philips brochure "HWR 60/120 (P) Meteorological Radar System with Passive Tracking Potential" is described a method, by means of which the change in the distance between the target and the measuring station can be measured by comparing two clock frequencies known very accurately. One of these is developed in the target and the other at the measuring station. By comparing a clock frequency transmitted from the target and a clock frequency developed at the measuring station, a Doppler shift of the clock frequency received from the target and caused by the approach or escape velocity of the target can be detected, and the rate of change of the distance can thus be determined. The method is characterized by a narrow bandwidth and requires the use of only one frequency channel, but its drawback is a very high stability required by the clock frequencies. The stability required e.g. in radio sonde observations is about $10^{-9}$/h. In practice, the development of so stable a clock frequency in a radio sonde results in major difficulties and expensive device solutions.

The object of the invention is to provide a new method and device, by means of which it is possible, on the basis of the Doppler shift, to measure the mutual rate of change of the measuring station and the target especially by using radio frequency radiation in such a way that the disadvantages described above are mainly avoided.

An additional object of the invention is to provide said measuring method and device without a need for especially accurate clock frequency oscillators at the measuring station and/or in the target to measured.

An additional object of the invention is further to provide a measuring method saving radio frequencies.

An additional object of the invention is further to provide such a method and device, in which relatively low-power transmitters and relatively simple circuit solutions with an economical realization mode can be used.

The primary application of the invention relates to an accurate tracking of the movement of a radio sonde moving with the wind for determining the wind vector by combining with the measurement an azimuth angle measurement by means of a radio direction finder as well data about the geometrical altitude of the radio sonde, which can be derived from the pressure, temperature and humidity measurements performed by the sonde or generally with a lower accuracy from the estimated ascending velocity of the sonde or instead of the altitude data also data about the elevation angle measured by direction finding.

For achieving the objects described above and to be clarified later, the method in accordance with the invention is mainly characterized in that the method comprises in combination the following phases:

(a) radio signals are transmitted from a measuring station and a target station, the frequencies of which signals deviate from each other by a relatively small frequency difference or by a Doppler frequency shift, the absolute value of which small frequency difference remains at least as high as the absolute value of the largest expectable Doppler frequency shift, (b) said radio signals are received at stations located opposite relative to their transmission stations, (c) a difference frequency or frequencies of the frequency including the Doppler shift and received at the measuring station and the target station and of the reference frequency of essentially the signal frequency range developed locally and transmitted to the opposite station are formed in such a way that a low-frequency or possibly a zero-frequency signal at the target station are obtained as the difference frequency or frequencies, (d) on the basis of said difference frequencies, the Doppler frequency shift is determined, by means of which the velocity of the target is obtained.

The device in accordance with the invention is on its part mainly characterized in that the radio devices of the measuring station and the target station comprise stable high-frequency oscillators, the frequencies of which have at least a difference of the size of the Doppler frequency shift, that said radio devices include heterodynes, to which a local oscillator frequency and a Doppler shifted frequency received by an antenna are led, and that the radio devices further comprise beat amplifiers or the like, on the basis of whose low-frequency signals the approach and escape velocity of a moving target station can be determined.

By means of the same solution, the present invention offers all practically important advantages listed below:

The measurement of a radial velocity based on the Doppler shift can be realized by means of the invention without especially stable clock frequency oscillators at the measuring station or in the moving target to be tracked.

The invention makes a narrow-bandwidth operation possible within a single frequency range. The method and the device save radio frequencies, which are important advantages e.g. in comparison with known transponder systems.

The measurement can be performed by means of the invention, in contrast to a radar, by using low-power transmitters, since the transmissions are suppressed relative to the square of the distance, but not according to a radar equation.

The circuit solutions needed for the measurement are relatively simple.

The invention is next described in detail with reference to certain preferable embodiments of the invention shown in the figures of the accompanying drawing, to which details the invention is not solely limited.

Figure 1:
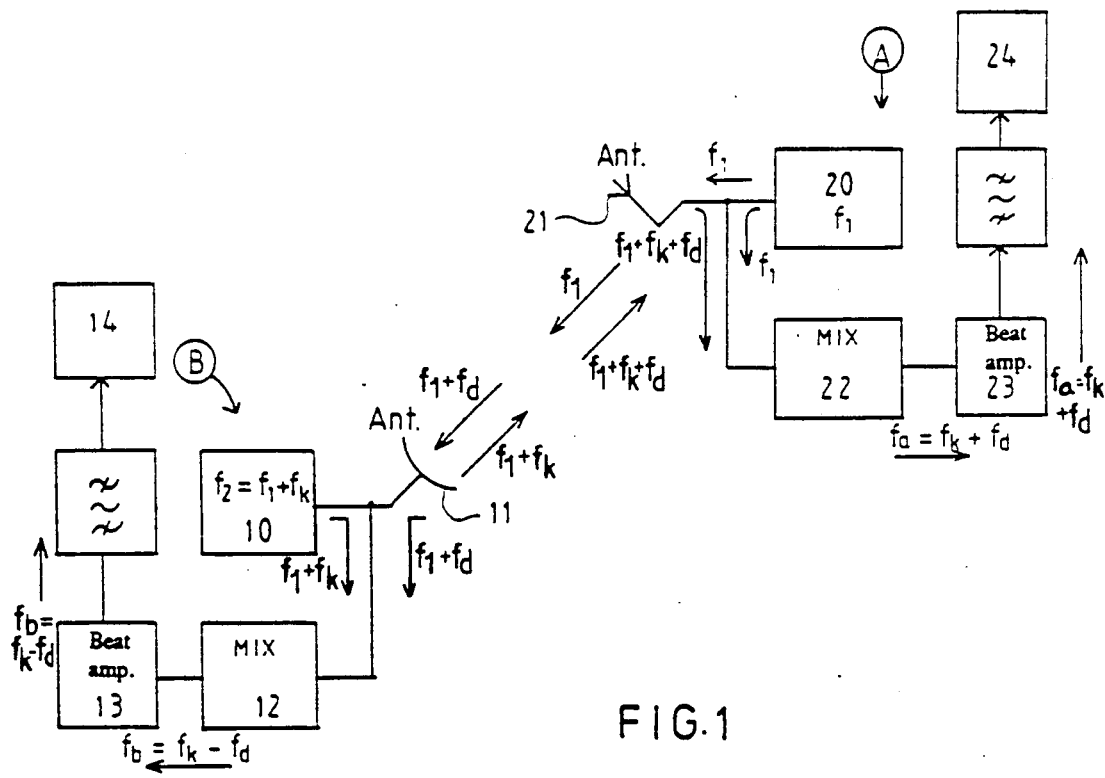
FIG. 1 shows schematically and in the form of a block diagram the main principle of the method according to the invention.

The main principle of the invention is illustrated in FIG. 1, in which B is a measuring station and A is a target station, the approach and escape velocity of which is measured at the measuring station B. The essential radio sections of the measuring station B and the target station A are similar to each other, comprising an antenna 11, 21 of a transmitter 10, 20, which antenna is in this example a directional antenna 11 at the measuring station B and a non-directional antenna 21 at the target station, as well as receivers, which on their part include a heterodyne 12, 22, a beat amplifier 13, 23 and a frequency meter 14, 24.

In accordance with FIG. 1, the frequency of the transmitter 20 of the moving target station A is f1. The frequency f2 of the transmitter 10 of the measuring station B is in this realization example slightly higher, i.e. f2=f1+fk, in which fk is yet greater than the greatest expectable Doppler frequency shift caused by the movement of the target station A, which shift is very accurately the same in the transmission of the measuring station B detected at the target station A as in the transmission of the target station A detected at the measuring station B, since both transmitters 10 and 20 operate practically on the same frequency f1≈f2.

It can be seen from FIG. 1 that a beat frequency fb=fk−fd occurs in the heterodyne 12 of the measuring station B and a beat frequency fa=fk+fd in the heterodyne of the target station, which frequencies are amplified in the beat amplifiers 13, 23 and measured with the frequency meters 14, 24 both at the target station A and the measuring station B. On the basis of the frequencies measured with the frequency meters 14, 24, a Doppler shift fd=(fa−fb)/2 is obtained, on the basis of which the velocity v of the target station A relative to the measuring station can be calculated in a known manner from the following formula:

$$v = \frac{c \cdot fd}{f_1}$$

In the example of FIG. 1, B is fa>fb when the target station is approaching the measuring station, and B is fb>fa when the target is drawing away from the station, in which case fd changes and has a minus sign, the result thus being unequivocal. Since fk is not included in the calculation formula of the Doppler frequency, no especially great requirements are set for the frequency stability of either transmitter. Especially great requirements are also not set for the accuracy of the frequency measurements, since the frequencies fb=fk−fd and fa=fk+fd are relatively small and the relative change of fd is great.

Figure 2:
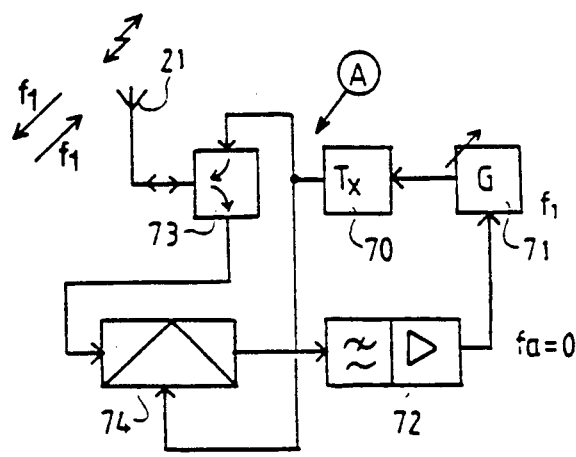
FIG. 2 shows in the manner according to FIG. 1 another realization mode of the invention.

FIG. 2 shows an inventive realization example, in which the frequency transmitted by the target station A is continuously adjusted exactly the same as the Doppler-shifted frequency f1 is has received from the measuring station B by using phase-locked loops. Only the target station A is shown in FIG. 2, and a more detailed realization mode of the measuring station is clarified below in connection with FIG. 6.

According to FIG. 2, the target station A transmits and receives measuring signals with the antenna 21. The antenna 21 is connected by means of a divider 73 both to the transmitter comprising an output stage 70 and a voltage controlled oscillator (VOC) 71 and to the receiver comprising a phase detector 74 and an amplifier 72 provided with a low pass filter. The signal, whose frequency is f1, coming to the antenna 21 from the measuring station B is led to the phase detector 74, into which also the signal of the oscillator 71 is sent. When the frequencies of the oscillator 71 and the frequencies of the received signal are the same, the output f1 of the phase detector 74 is a direct voltage proportional to the phase difference of said signals. Said direct voltage affects via the amplifier 72 the oscillator 71 and adjusts its frequency in such a way that the phase-locked loop formed by the blocks 74, 72, 71 and 70 locks and remains locked, i.e. the frequency of the oscillator 71 is always the same as the frequency f1 of the received signal.

Figure 6:
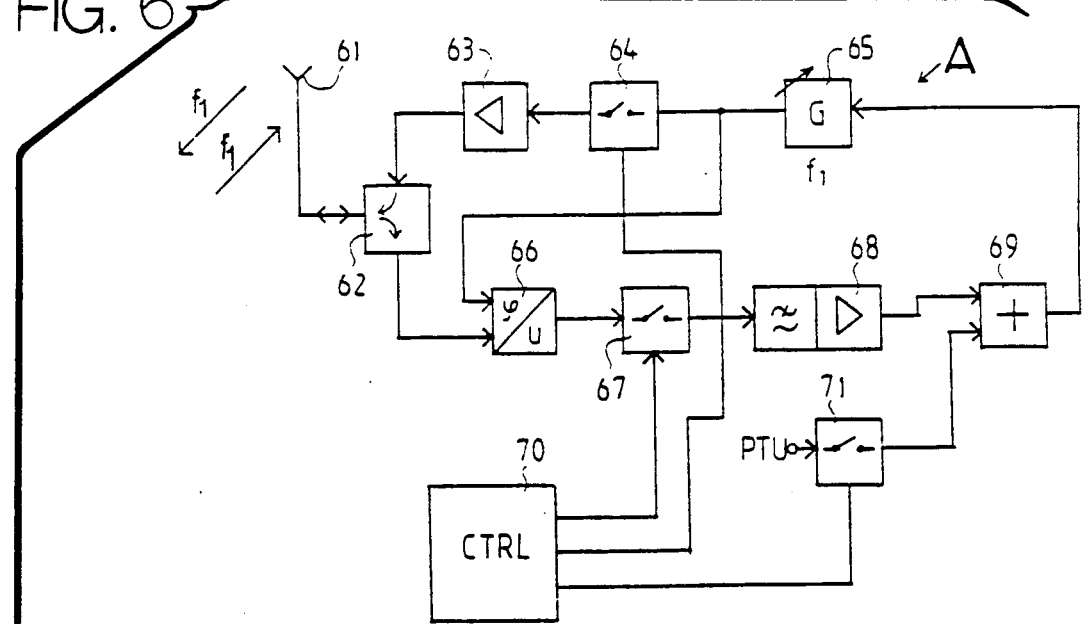
FIG. 6 shows schematically in more detail an inventive realization mode of the sonde of FIG. 3 and 4.
Figure 6:
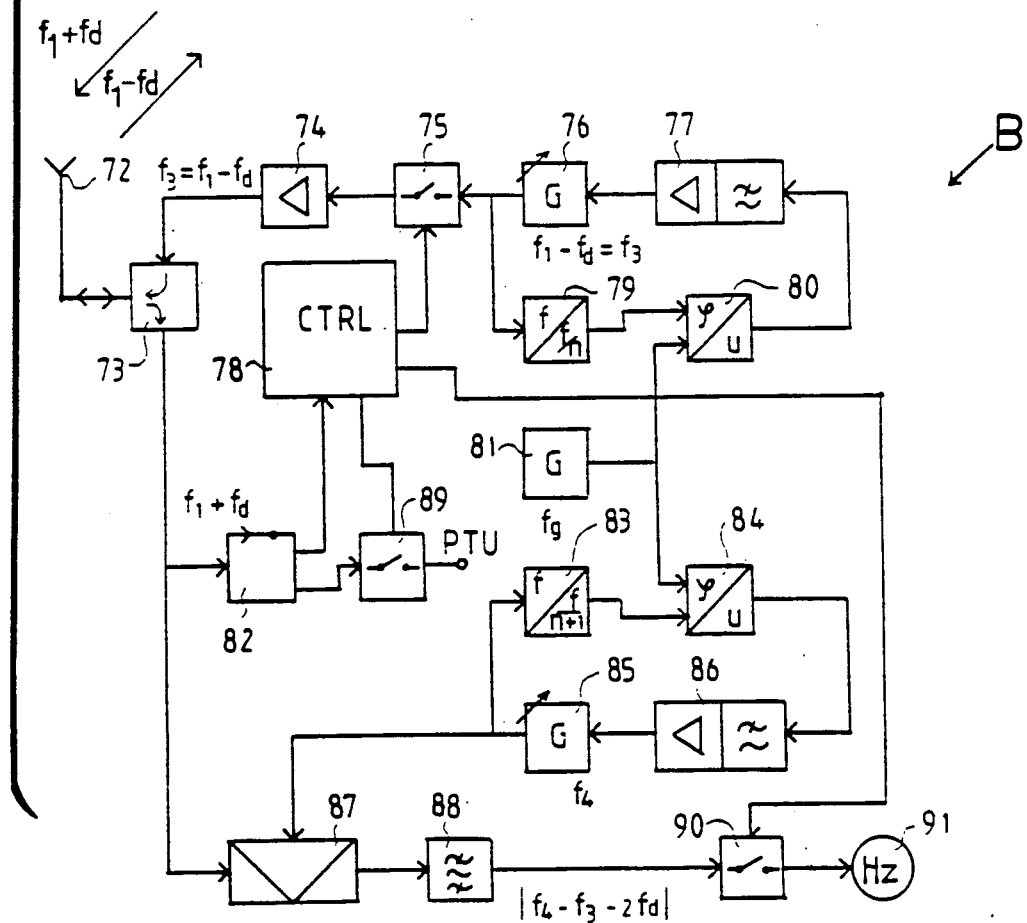

In accordance the inventive main principle described in FIG. 1, the solution of FIG. 2 is always fa=0 and fk=−fd. fb's absolute value /fb/=2 fd, but fd's sign cannot be determined. FIG. 6 shows an arrangement, with which also fb's sign in a solution of FIG. 2 can be determined and fd's value can be unequivocally detected. The solution of FIG. 6 is clarified in more detail below.

The general principle of the invention has been described above with reference to FIG. 1 and 2. In the solution of FIG. 1, it has not yet been shown, how the data about the frequency fb measured in the target A is transmitted at the measuring station B without disturbing the Doppler measurement. The measured frequencies fa and fb are to be sensed at the same or nearly the same time so that no great stability would be required from the transmitter. The are in principle several methods for this, some of which are clarified below.

Figure 3:
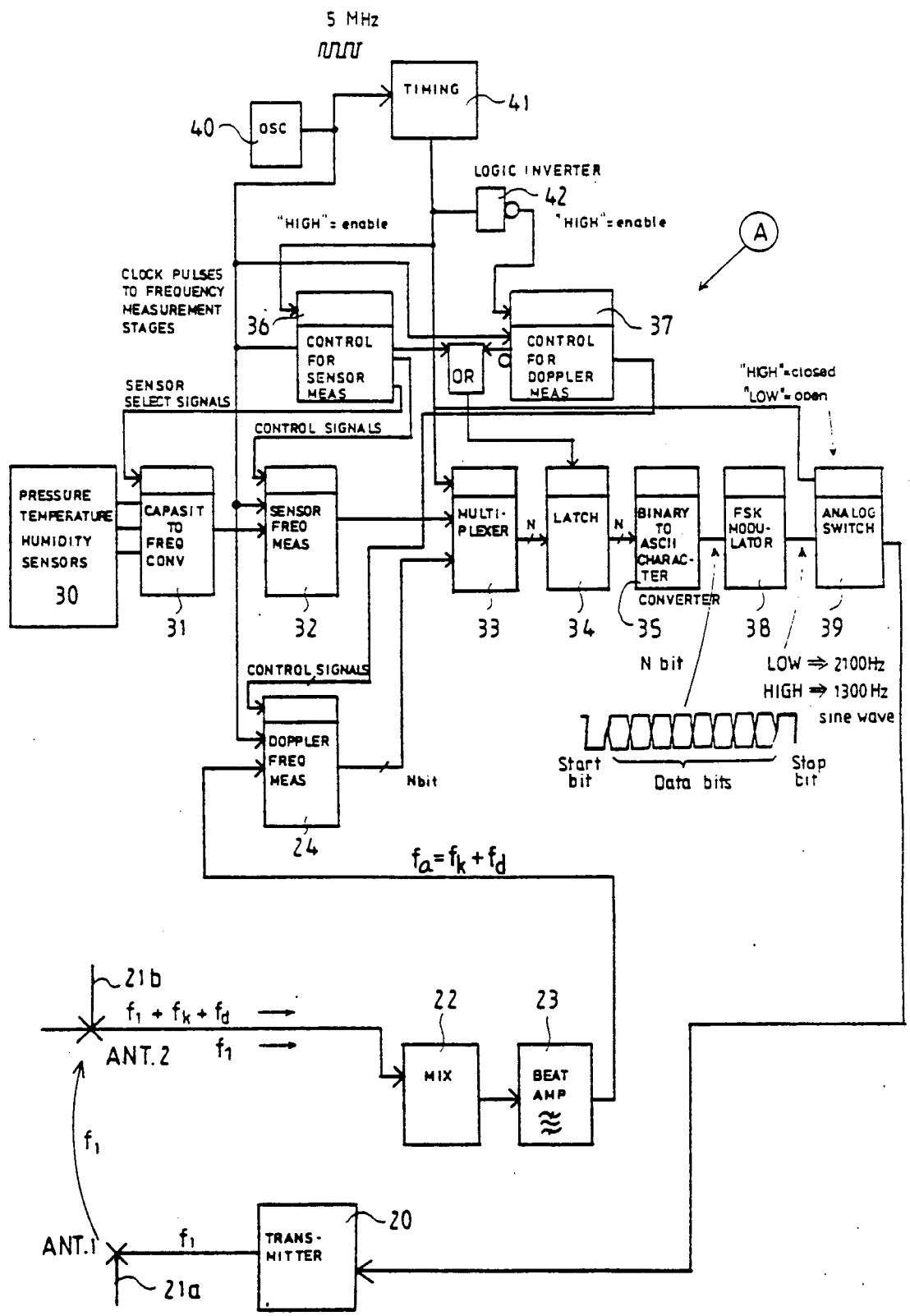
FIG. 3 illustrates in the form of a block diagram a certain preferable digital realization example of the invention relative to the radio devices in a sonde.
Figure 4:
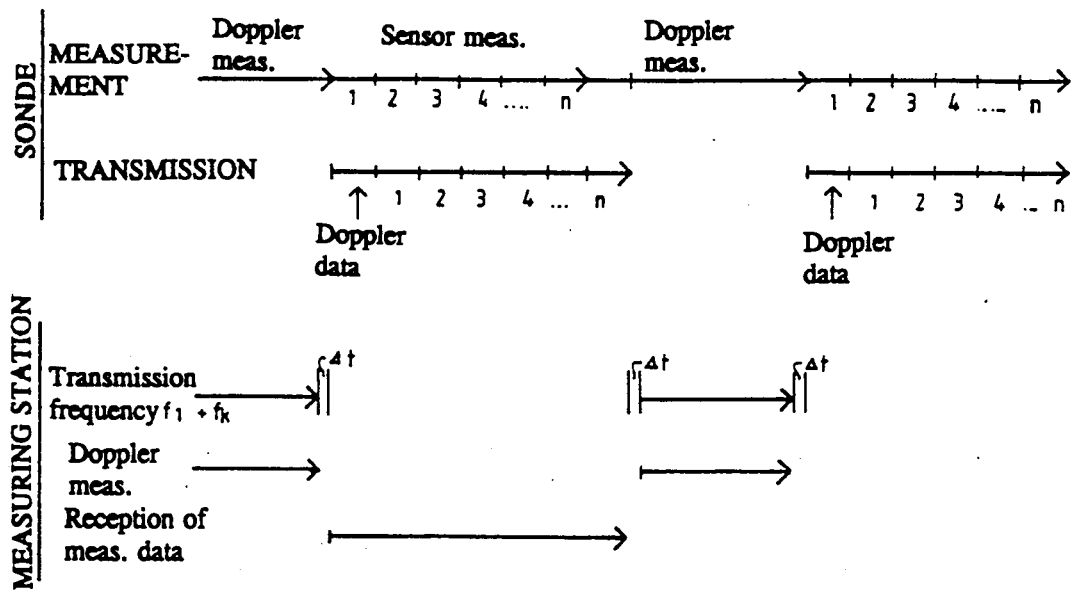
FIG. 4 illustrates the principle of the operating sequences of the device according to FIG. 3.
Figure 5:
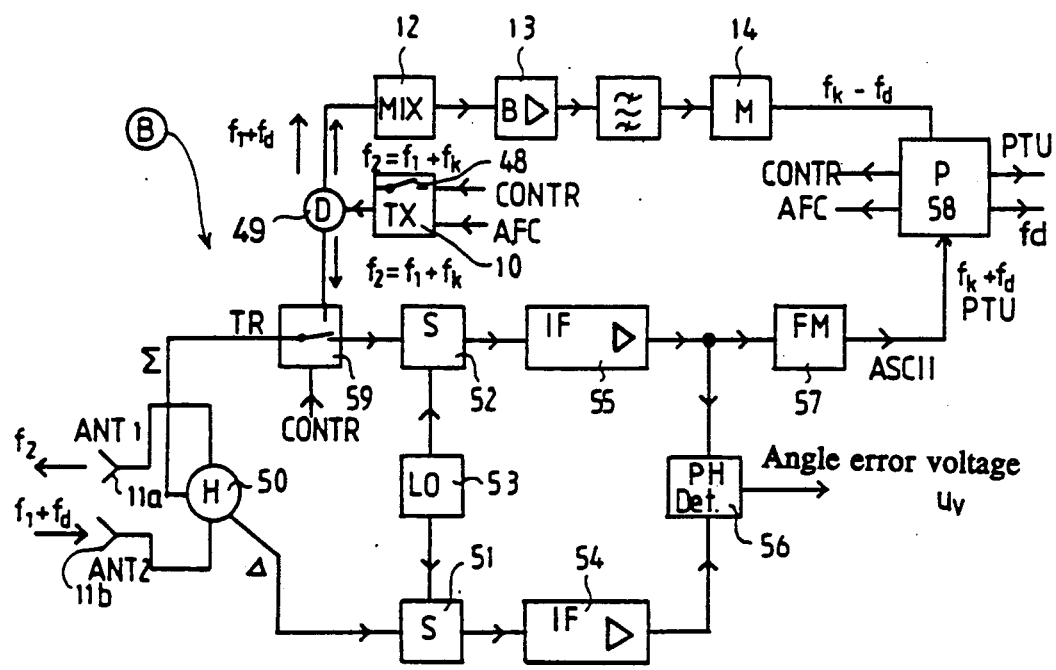
FIG. 5 shows schematically an arrangement of earth-station devices to be used in connection with the sonde of FIG. 3 and 4.

In the realization example of FIG. 3, 4 and 5, the target station A to be tracked is a meteorological radio sonde, which measures the atmospheric pressure, temperature and humidity (PTU) e.g. with capacitive sensors 30. FIG. 3 shows in the form of a block diagram the radio devices in the sonde as well as the related digital measuring and control electronics. The processing of the measurement data occurs digitally and the data transmissions to the measuring station B are performed with a transmitter 20 tuned within range of 1660–1700 MHz by using 2100 Hz and 1300 Hz subcarrier waves and FM-modulation. The transmission of the data obtained about the inventive Doppler measurement, i.e. the transmission of the above-mentioned beat frequency fa, occurs according to the same method as the transmission of the pressure, temperature and humidity data.

According to FIG. 4, the system formed by the sonde A and the measuring station B has two operating modes, the Doppler measurement mode and the transmission mode, during which also the sensor measurements are performed. During the Doppler measurement mode, the transmitter of the measuring station B is in operation transmitting a carrier wave on the frequency f1+fk, and the transmitter 20 of the sonde A is similarly in operation transmitting a carrier wave on the frequency f1. The frequency fk can be e.g. ca. 1 kHz. The frequency fk is maintained approximately constant by slowly adjusting the frequency of the transmitter of the measuring station B by means of an automatic frequency control (AFC), when needed. During the Doppler measurement mode, the beat frequencies fa in the sonde A and the frequency fb at the measuring station B are measured.

During the transmission mode of the sonde A, the sensor measurements are performed with the unit 30, and the transmission of the Doppler measurement data or the beat frequency fa measured in the sonde A to the measuring station B occurs by modulating the transmitter 20 of the sonde A and by receiving this transmission at the measuring station B by means of a conventional FM-receiver. In order to make this possible, the transmitter of the measuring station B is disconnected during the transmission mode.

The above arrangements ensure that the FM-modulation required by the sonde A for the transmission of the measurement data can in no way disturb the performance of the Doppler measurement. The duration of the transmission mode can be e.g. ca. 1 s and that of the Doppler measurement mode the same or slightly shorter (FIG. 4). If these times are prolonged, some pitch resolution of the sensor measurements is unnecessarily lost, and on the other hand, the amount of data needed can easily be transmitted during 1 s e.g. as ASCII-characters by using a transmission rate of 1200 bauds.

The functions of the measuring station A and the sonde A must be synchronized at the start of an observation, and they must be kept synchronized during the entire observation. This occurs by tracking at the measuring station A the arrival time of the ASCII-characters of the transmitter of the sonde A and making small corrections in the timing of the operating cyclings of the measuring station B, when necessary. In practice, it is preferable to leave a small (a couple of milliseconds) dead time interval Δt, shown in FIG. 4, between the operating cycles, during which time interval no functions are activated.

Since the Doppler measurement is intermittent, a broadening of the spectrum occurs in the measurement, which amounts to the inverse value of the duration of the measurement and in this example ca. 1 Hz. This factor and other factors broadening the spectrum or the noise of the frequency measurement are of no importance to this application, since the wind measurement result is normally equalized in the calculation within several tens of seconds.

According to FIG. 3, the sonde utilizes two vertically polarized antennas 21a and 21b, the location of which is selected in such a way that the power transferring from the transmitter 20 to the heterodyne 22 is at the best possible level from the point of view of the noise of the heterodyne. Other means for separating the transmitter 22 and the receiver from each other are not needed, since the power of the transmitter 20 is only a couple of hundreds of mW. The vertical polarization in the antennas 21a and 21b effectively suppresses the transmission radiating toward the earth and reflecting back therefrom, since the null points of the radiation pattern of the antenna are in this direction. The heterodyne 22 is most preferably a diode heterodyne. The amplification of the beat amplifier 23 is so high that a beat signal divides in the output of the amplifier 23, whereby suitable pulses are obtained for the digital frequency meter 24. For reducing noise, the amplifier 23 includes a low pass filter, whose average frequency is fk and whose width is determined according to the largest and smallest (negative) expectable Doppler shift and, a bandwidth of ca. 1000 Hz is generally sufficient. The transmitter 20 is crystal stabilized.

The operation of the digital circuits shown schematically in FIG. 3 is described below.

| | |
|---|---|
| (OSC) (40) | The unit 40 is an oscillator provided with a normal microprocessor crystal. |
| TIMING (41) | The unit 41 (Sensor, Doppler, Low) divides the time of the measuring cycle for sensor and Doppler measurements. |
| CONTROL FOR SENSOR MEASUREMENT (36) | When this unit 36 is enabled, it provides the measuring commands for the "SENSOR FREQUENCY MEASUREMENT" -stage 32 and selects the sensors 30 to be measured alternately. |
| SENSOR FREQUENCY MEASUREMENT (32) | This stage 32 provides as the basic data an N-bit word, which includes the data about the measured sensor frequency (the frequency of OSC 40 is known). |
| CONTROL FOR DOPPLER MEASUREMENT (37) | When the stage 37 in enabled, it provides the measuring commands for the "DOPPLER FREQUENCY MEASUREMENT" -stage 24. |
| DOPPLER FREQUENCY MEASUREMENT (24) | This stage 24 provides as the basic data an N-bit word, which includes the data about the measured fa-frequency (the frequency of OSC 40 is known). |
| MULTIPLEXER (33) | Either of the N-bit inputs is selected for the N-bit output by means of the multiplexer 33. |
| LATCH (34) | When the Doppler measurement is enabled, the TIMING stage 41 must transmit a control signal "LOW". The CONTROL FOR DOPPLER MEASUREMENT -stage 37 then activates the counter of the DOPPLER FREQUENCY MEASUREMENT - stage 24. The completed measuring result remains in the output of the DOPPLER FREQUENCY MEASUREMENT -stage 24. Before returning to the measurement mode of the sensors 30, the measuring result is stored in the LATCH stage 34. The storing occurs by giving a pulse via an OR-circuit from the CONTROL FOR DOPPLER MEASUREMENT -stage 37. In this way, the Doppler data can be transmitted immediately, when the sensor measurement is started. The measuring result of each sensor 30 is correspondingly stored in the LATCH 34 to free the measuring stage for the next sensor measurement. |
| BINARY ASCII CHARACTER CONVERTER (35) | A sufficient number of standard ASCII-characters is formed from binary numbers in the stage 35, and the bit rate can be e.g. 1200 bits/s. |
| FSK MODULATOR (38) | The ASCII-characters in a serial form are modulated in the unit 38 in such a way that a sine frequency of 2100 Hz is transmitted during the "LOW"-mode and a sine frequency of 1300 Hz is transmitted during the "HIGH"-mode(CCITT V.23, 1200 baud-standard). |
| ANALOG SWITCH (39) | An FSK subcarrier wave is led to the transmitter via the analog switch 39. When a Doppler measurement is performed, the switch 39 is open and the frequency of the transmitter is on its basic frequency f1. When a measurement of the sensors 30 is performed, the analog switch 39 is closed, whereby the measurement data can enter the transmitter 20 and its modulator. |

The digital electronics shown in FIG. 3 can most advantageously be realized by means of an ASIC-circuit. The same functions can be achieved by means of electronics based on a microprocessor.

FIG. 5 shows schematically and in a simplified form the measuring station B to be used together with the sonde A of FIG. 3 and 4, or the like. A conventional monopulse theodolite based on amplitude comparison is used for angle tracking and for detecting the modulation transmitted by the sonde A. FIG. 5 shows only the arrangements needed for a unidimensional angle measurement.

The theodolite is provided with feed antennas 11a and 11b having a common parabolic reflector. A sum voltage $\Sigma$ and a differential voltage $\Delta$ of the received antenna signals is formed in a comparator 50. These signals are led to two receivers having a common local oscillator and including heterodynes 51 and 52 and intermediate frequency amplifiers 54 and 55. A phase sensitive detector 56 provides an angle error voltage Uv for the control of a directional-antenna servo. The output of a frequency modulation detector 57 is the information transmitted by the sonde A, which information includes the data transmitted by the sonde A about the beat frequency $fa = fk + fd$ measured in the sonde A as well as the data about the pressure, temperature and humidity (PTU) measured with the sensors 30. The operation is as above when the system is in a transmission mode, whereby no Doppler measurement occurs.

The measuring station B shown in FIG. 5 switches over to the Doppler measurement mode, when the control signal CONTR provided by a processor 58 changes the position of a TR-switch and closes a start-up switch 48 of the transmitter 10, whereby the measurement of the beat frequency occurring in the heterodyne 12 takes place in the manner described above.

In addition to the control of the synchronization and fine-adjustment, the purpose of the processor 58 shown in FIG. 5 is to maintain the frequency fk at about 1 kHz by developing for the transmitter 10 an equalization voltage AFC as well as to provide as outputs the PTU-data and the measured Doppler frequency fd for subsequent processing.

It is in practice advantageous that the transmitter 10 of the measuring station B of FIG. 5 has a higher power than that of the transmitter 10 of the sonde A, whose power is a couple of hundreds of mW, i.e. a few W. Since it is cumbersome to use separate antennas for transmission and reception at the measuring station B, too high-level an entry of the transmitter power into the heterodyne is prevented by means of a hybrid joint 49. In this example, the theodolite is not switched on during the Doppler measurement, and for improving the angle tracking, it is useful to control the antenna servo then programwise on the basis of earlier data.

According to FIG. 6, the target station A transmits and receives the radio signals with an antenna 61, and the connection of the antenna 61 to the transmitter and the receiver is arranged by means of a divider 62. Separate transmission and reception antennas can alternatively also be used. The operation of the target station A is divided timewise into three operating cycles comprising the transmission of the PTU-signal, the transmission of the Doppler measurement signal and the reception of the Doppler measurement signal. The operation is timed and controlled by a control unit 70 by means of electronic switches 64, 65 and 71.

In the reception mode of the Doppler measurement signal, the switches 64 and 71 are open and the switch 67 is closed. The signal, whose frequency is $f1 = f3 + fd$, entering the antenna 61 is led to a phase detector 66 together with a signal of the voltage controlled oscillator 65. The phase detector 66 can be e.g. a diode ring modulator, a double-grid channel transistor or the like.

When the frequencies of the voltage controlled oscillator 65 and of the received signal are the same, the output f1 of the phase detector 66 is a direct voltage proportional to the phase difference of said signals. The received direct voltage passes via the switch 67, a low pass filter/amplifier combination 68 as well as a summing unit 69 to the voltage controlled oscillator 65 and adjusts its frequency in such a way that the phase-locked loop of the blocks 65, 66 and 68 locks and remains locked, i.e. the frequency of the voltage controlled oscillator 65 is always the same as the received frequency f1 irrespective of its prevailing value.

In the transmission mode of the Doppler measurement signal, the switches 67 and 71 are open and the switch 64 is closed. After the switch 67 has opened, the adjusting voltage of the voltage controlled oscillator 65 remains, owing to the low pass filter, in the value preceding the opening, except for a minor drift, and the frequency of the oscillator 65 thus remains constant. In addition to the low pass filter, e.g. a digital sample and holding circuit can, when necessary, be used, which circuit is comprised of an analog/digital converter, a read/write memory (RAM) and a digital/analog converter with control circuits. The output signal of the oscillator 65 is led via the switch 64 to a power amplifier 63 and further via the divider 62 to the antenna 61. In this way, the target station A transmits an unmodulated carrier wave with a frequency of f1 = f3 + fd.

In the transmission mode of the PTU-signal, the switches 64 and 71 are closed and the switch 67 is open. The frequency of the voltage controlled oscillator 65 still remains approximately constant, as in the transmission mode of the Doppler measurement signal, too. The PTU-signals are led via the switch 71 and the summing unit 69 to the voltage controlled oscillator, whose frequency is thus modulated. The modulated signal is led via the switch 64, the power amplifier 63 and the divider 62 to the antenna 61, i.e. it is transmitted to the measuring station B.

The measuring station B according to FIG. 6 transmits and receives radio signals with the antenna 72 and the divider 73 performs the connection of the antenna alternately to the transmitter and the receiver. Separate transmission and reception signals can also alternatively be used. The timing of the measuring station B is the same as that of the target station A, as described above. The timing is controlled independently by the target station A and the measuring station complies with it.

When the target station A is in the reception mode of the Doppler signal, i.e. when it transmits no signal, a control unit 78 of the measuring station closes a switch 75 and opens switches 89 and 90. A reference oscillator 81 of the measuring station B, the frequency fg of which oscillator is e.g. 10 kHz, acts as a reference for two phase-locked loops. The phase-locked loop of the transmitter is comprised of a programmable frequency divider 79, a phase detector 80, a low pass filter/amplifier combination 77 and a voltage controlled oscillator 76. The frequency of the voltage controlled oscillator 76 is f3 = n·fg (f1 − fd is constant), and the signal of the oscillator 76 is led via the switch 75, the power amplifier 74 and the divider 73 to the antenna 72, from which it is transmitted to the target station A. The control unit 78 keeps the switch closed and continues the transmission for a predetermined time, typically ca. 0.1–1 s.

After the target station A shown in FIG. 6 has started its own transmission, the measuring station B switches over to the reception mode of the Doppler measurement signal, in which the switch 90 is closed and the switches 75 and 89 open. From the antenna 75 via the divider 73 comes a signal (frequency f1 + fd = f3 + 2fd) to the heterodyne 87, which can be for example a diode ring modulator, a double-grid channel transistor or the like. The local oscillator signal to be led to the heterodyne 87 is formed by means of a phase-locked loop. The phase-locked loop is comprised of a programmable divider 83, a phase loop. The phase-locked loop is comprised of a programmable divider 83, a phase detector 84, a low pass filter/amplifier combination 86 and a voltage controlled oscillator 85. The frequency of the voltage controlled oscillator 85 is f4 = (n+1)·fg. A differential frequency / f4 − f3 − 2fd / is obtained from the heterodyne 87 via a low pass filter 88. When f3 = n·fg, f4 = (n+1)·fg and in addition fg > 2fd, the differential frequency is unequivocally f4 − f3 − 2fd = fg − 2fd. The differential frequency is led via the switch 90 to a frequency meter 91, with which its value can be determined and the Doppler shift fd can further be calculated, when fg is known.

When the target station A of FIG. 6 starts after a predetermined time the transmission of the PTU-signal, the control unit 78 switches the PTU-signal of the measuring station to the reception mode, in which the switches 75 and 90 are open and the switch 89 is closed. The frequency modulated signal transmitted by the target station A is then received and detected with a conventional FM-receiver 82, and the detected PTU-signal is led via the switch 89 for further processing. For synchronizing the operation of the control unit 78 with the target station A, the receiver 82 provides also a control based on the fact that when the signal from the target station A is interrupted, it is assumed that it has switched to the reception mode of the Doppler measurement signal. The remaining transfers from one mode to another are performed within the scope of the necessary tolerances after the same constant times have elapsed at the target and measuring station A, B.

The invention has above been described in detail by referring only to the inventive application examples used in the sonde tracking and in the measurement of its velocity. However, on the basis of the above description, it is apparent to those skilled in the art that the invention can also be applied to several other corresponding objects.

With the scope of the inventive idea defined in the following patent claims, the various details of the invention can vary and deviate from the above description presented by way of example only.

We claim:

1. A method for measuring the velocity (v) of a moving target (A) by utilizing electromagnetic radiation, most preferably within the radio frequency range, in which method a radio transmitter-receiver arrangement is used both at the measuring station (B) and in the target (A) to be measured, by means of which radio signals are transmitted and correspondingly received at the opposite stations (A, B), the frequencies of which signals include Doppler shifts (fd) to be observed both at the measuring station (B) and in the measuring target (A), and on the basis of said Doppler shifts (fd), the escape and/or approach velocity (v) of the target to be measured is determined relative to the measuring station (B), characterized in that the method comprises in combination the following phases:

(a) radio signals are transmitted from the measuring station (B) and the target station (A), the frequencies of which signals deviate from each other by a relatively small certain frequency difference (fk) or by a Doppler frequency shift (fd), the absolute value of said small frequency difference being at least as high as the absolute value of the largest expectable Doppler frequency shift (fd$_{max}$);

(b) said radio signals are received at stations (B, A) located opposite relative to their transmission stations (A, B);

(c) a difference frequency or difference frequencies (fb, fa) of the frequency including the Doppler shift (fd) and received at the measuring station (B) and the target station (A) and of a reference frequency of substantially a signal frequency range developed locally and transmitted to the opposite station are formed in such a way that a low-frequency or possibly a zero-frequency signal at the target station is obtained as the difference frequency or frequencies (fb, fa);

(d) on the basis of said difference frequencies (fb, fa), the Doppler frequency shift (fd) is determined, by means of which the velocity (v) of the target (A) is obtained;

the transmission frequency (f1+fk; f1) of each station is used as a local oscillator frequency both at the measuring station (B) and the target station (A); and the difference frequencies (fb, fa) of said local oscillator frequency and of the frequency of the Doppler shifts (f1+fk+fd;f1+fd) are formed by a heterodyne (12, 22) and said difference frequencies are amplified in beat amplifiers (13, 23) whose output signals are led to a frequency measuring device.

2. A method according to claim 1, characterized in that the target station (A) is a radio sonde moving with the wind, the Doppler measurement method being used for accurately tracking the movement of said sonde and for determining the wind vector, and that an azimuth angle measurement by means of a radio direction finder as well the data about the altitude of the radio sonde are combined with the Doppler measurement.

3. A method according to claim 2, characterized in that the sensors (30) of the radio sonde (A) measure at least the pressure of the atmosphere enveloping the radio sonde (A), most preferably also the temperature and the humidity, and that the transmission of said sensor-measurement and Doppler-measurement results to the measuring station (B) by means of the radio transmitter of the sonde occurs alternately with the Doppler measurements.

4. A method according to claim 2 or 3, characterized in that the geometric altitude of the radio sonde (A) is derived from the group consisting of pressure, temperature, or humidity measurements performed by the sonde, estimated or measured ascending velocity of the sonde, and an elevation angle measured by direction finding.

5. A device for realizing the method according to claim 1 and comprising a transmitter-receiver arrangement (10, 11, 12) located at the measuring station (B) as well as an antenna (11) and a corresponding transmitter-receiver arrangement (20, 22, 23) located in the moving target to be measured as well as an antenna (21; 21a, 21b), characterized in that the radio devices of the measuring station (B) and the target station (A) comprise stable high-frequency oscillators (10, 20), the frequencies of which have at least a difference of the size of the largest expectable Doppler shift frequency, that said radio devices include heterodynes (12, 22), to which a local oscillator frequency and a Doppler shifted frequency received by an antenna have been led, and that the radio devices further comprise beat amplifiers (13, 23), on the basis of whose low-frequency signals (fa, fb) the approach and escape velocity (v) of the moving target station (A) can be determined.

6. A device according to claim 5, characterized in that the moving target station is a radio sonde (A) which includes measuring sensors (30) for measuring the pressure, temperature and humidity of the surrounding atmosphere, and that the measuring station (B) is a meteorological earth station which includes devices for measuring the azimuth angle of the radio sonde by means of a radio direction finder as well as measuring devices for detecting the geometric altitude of the radio sonde.

7. A method for measuring the velocity (v) of a moving target (A) by utilizing electromagnetic radiation, most preferably within the radio frequency range, in which method a radio transmitter-receiver arrangement is used both at the measuring station (B) and in the target (A) to be measured, by means of which radio signals are transmitted and correspondingly received at the opposite stations (A, B), the frequencies of which signals include Doppler shifts (fd) to be observed both at the measuring station (B) and in the measuring target (A), and on the basis of said Doppler shifts (fd), the escape and/or approach velocity (v) of the target to be measured is determined relative to the measuring station (B), characterized in that the method comprises in combination the following phases:

(a) radio signals are transmitted from the measuring station (B) and the target station (A), the frequencies of which signals deviate from each other by a small certain frequency difference (fk) or by a Doppler frequency shift (fd), the absolute value of said small frequency difference being at least as high as the absolute value of the largest expectable Doppler frequency shift (fdmax);

(b) said radio signals are received at stations (B, A) located opposite relative to their transmission station (A, B);

(c) a difference frequency or difference frequencies (fb, fa) of the frequency including the Doppler shift (fd) and received at the measuring station (B) and the target station (A) and of a reference frequency of substantially a signal frequency range developed locally and transmitted to the opposite station are formed in such a way that a low-frequency or possibly a zero-frequency signal at the target station is obtained as the difference frequency or frequencies (fb, fa);

(d) on the basis of said difference frequencies (fb, fa), the Doppler frequency shift (fd) is determined, by means of which the velocity (v) of the target (A) is obtained;

the transmission frequency of a transmitter of the target station (A) is continuously adjusted exactly the same as the Doppler shifted frequency received by the target station (A) from the measuring station (A)(f1=f3+fd, whereby fa+0); and said adjustment is performed by using phase-locked loops.

8. A device as in claim 5 for realizing the method according to claim 7, characterized in that the target station (A) is provided with a phase lock which locks on the frequency of the input signal, as well as a controlled switch and a circuit means which maintains the frequency of the oscillator (65) constant, when no signal is transmitted from the measuring station (B).

9. A device according to claim 8, characterized in that the measuring station (B) is provided with two phase-locked loops based on a common reference oscillator, one of which controls the transmitter and the other of which acts as a local oscillator, as well as with a heterodyne, which forms the differential frequency including the Doppler frequency.

* * * * *